United States Patent [19]

Fenske et al.

[11] Patent Number: 4,793,574

[45] Date of Patent: Dec. 27, 1988

[54] BACKREST CUSHION FOR AN AIR PASSENGER SEAT

[75] Inventors: Jürgen W. Fenske, Memmingen; Ludwig Steyrer, Bad Wildungen; Michael Eble, Ulm, all of Fed. Rep. of Germany

[73] Assignee: Metzeler Schaum GmbH, Memmingen, Fed. Rep. of Germany

[21] Appl. No.: 3,106

[22] Filed: Jan. 14, 1987

[30] Foreign Application Priority Data

Jan. 31, 1986 [DE] Fed. Rep. of Germany ....... 3603017
Mar. 4, 1986 [DE] Fed. Rep. of Germany ....... 3607041

[51] Int. Cl.⁴ .............................................. B64D 11/06
[52] U.S. Cl. ................................ 244/122 R; 297/460; 297/DIG. 1; 297/DIG. 5; 5/459; 5/481; 428/921
[58] Field of Search ............. 244/122 R; 297/DIG. 1, 297/DIG. 5, 460, 284; 5/459, 464, 481

[56] References Cited

U.S. PATENT DOCUMENTS

| | | | |
|---|---|---|---|
| 2,135,657 | 11/1938 | Church | 297/DIG. 1 |
| 2,619,659 | 12/1952 | Futterknecht | 5/481 |
| 3,028,610 | 4/1962 | Talalay | 297/DIG. 1 |
| 3,833,260 | 9/1974 | Harder, Jr. | 297/DIG. 1 |
| 4,110,881 | 9/1978 | Thompson | 297/DIG. 1 |
| 4,223,095 | 9/1980 | Esser et al. | 428/921 |
| 4,484,782 | 11/1984 | Larson | 297/284 |
| 4,493,871 | 1/1985 | Edgerley et al. | 5/459 |

FOREIGN PATENT DOCUMENTS 3140340 4/1983 Fed. Rep. of Germany .......... 5/459

*Primary Examiner*—Galen Barefoot
*Assistant Examiner*—Rodney Corl
*Attorney, Agent, or Firm*—Sprung Horn Kramer & Woods

[57] ABSTRACT

In a backrest cushion of polyurethane foam in flame-retardant finish for air passenger seats, the protection against the risk of fire spreading is increased and at the same time the weight is reduced and the comfort increased according to the invention by making the whole volume of the backrest cushion of a flame-retardant foam and providing it, at least in the region which is put under pressure in use, with recesses extending parallel to the direction of pressure and all ending equidistant from the surface of the cushion.

14 Claims, 2 Drawing Sheets

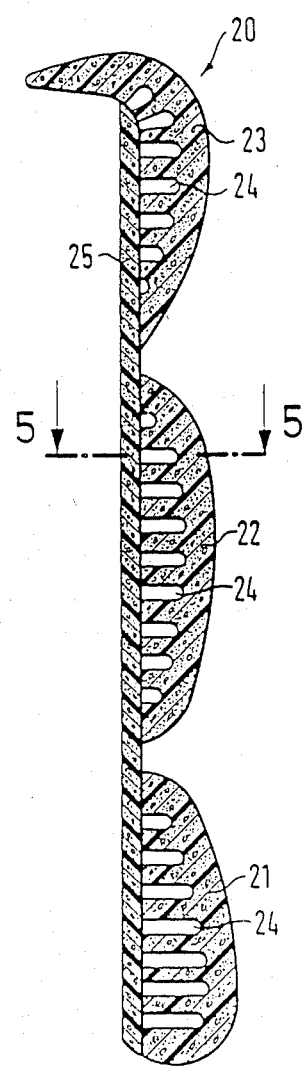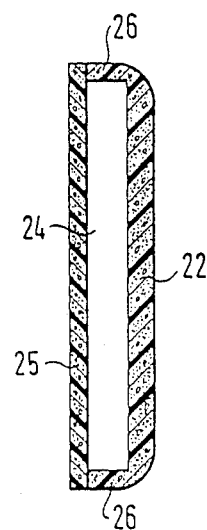

BACKREST CUSHION FOR AN AIR PASSENGER SEAT

This invention relates to a backrest cushion of polyurethane foam in a flame-resistant finish for an air passenger seat.

Backrest cushions of this kind in a flame-resistant finish have already been proposed, for example in the earlier Patent Application No. P 35 07 085.4. In the backrest cushion described there, a cushion member manufactured from conventional untreated foam is covered with a film of flame-resistant polyurethane foam at least in those areas which are not covered by the seating frame. In a seating cushion of this kind having a centre of ordinary material covered with a suitably treated foil, this covering foil of foam must be treated with sufficient fire-retarding agent so that the material inside it will also be protected in the event of fire. This means that the foil must be inpregnated with a very large quantity of fire retardant, which not only increases its weight but also impairs the seating comfort by considerably increasing the compression resistance and reducing the long-term elasticity.

Compared with these known products, it is an object of the present invention to provide a backrest cushion for air passenger seats which is not only more fire-resistant but also lighter in weight and can be individually adjusted in the degree of comfort of its different parts according to the different pressures applied to the cushion in use.

To solve this problem according to the invention, the whole body of the cushion is made of a foam with flame retardant finish in which at least those areas which are under pressure when in use have recesses extending parallel to the direction of the pressure and all ending equidistant from the surface of the cushion.

Since this cushion is made completely from flame-resistant foam, the quantity required for impregnating it is greatly reduced, being now only of the order of 250 to 350% by weight, so that the overall weight of the cushion is greatly reduced. A further reduction in weight is obtained by the provision of the recesses, which may consist of cylindrical recesses or of parallel incisions in the form of grooves extending transversely across the back at least over a part thereof, and these recesses or incisions also enable the cushion or different parts thereof to be individually adjusted to the comfort requirements.

These recesses may be open to the back of the cushion or they may be covered with another layer of foam which has been treated with a flame-retardant finish.

The backrest cushion may be manufactured from a foam layer which may be profiled on the upper surface according to the desired contour for the back and may be provided with cylindrical openings extending right through the thickness of the layer and covered on the surface with a smooth, continuous sheet of foam of constant thickness.

In one particularly advantageous design, three separate, individually curved cushion parts traversed by incisions in the form of grooves are provided for the lumbar region, the shoulder region and the head region and attached to one continuous length of impregnated foam.

The flame-retardant treatment of the foam may suitably be carried out by impregnating it with antimony trioxide and aluminium hydroxide contained in a chloroprene latex binder so that the gross weight of the impregnated foam finally obtained amounts to about 60 to 80 kg/m$^3$.

The structure and function of exemplary embodiments of the invention are described below with reference to schematic drawings in which:

FIG. 4 represents a longitudinal section through a backrest cushion composed of separate cushion parts, and FIG. 5 represents a cross-section through the backrest solution of FIG. 4 on the section line 5—5 of FIG. 4.

Figure 1:
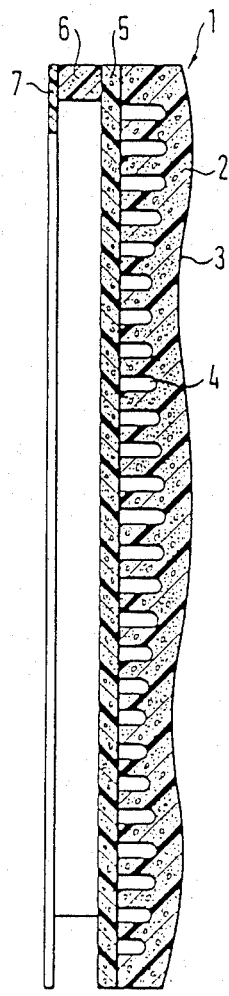
FIG. 1 represents a longitudinal section through a backrest cushion with incisions in the form of grooves.

According to FIG. 1, the backrest cushion 1 substantially consists of a flame-resistant foam layer 2 in which the surface 3 is curved according to the desired contour for the backrest and in which parallel incisions 4 in the form of grooves extend into the substance of the layer from the rear surface almost over the whole width of the cushion 1. These incisions 4 all terminate at the same distance from the surface 3 of the backrest cushion 1 to leave a continuous foam layer of uniform thickness over that region of the foam layer 2 which is permeated by the incisions 4.

Another continuous layer of foam 5 is provided on the rear surface of the foam layer 2 to cover the incisions 4. In addition, the backrest cushion 1 has an edge 6 of foam extending along the periphery of the rear surface and optionally another thin layer of foam 7 so that when completed, the backrest cushion 1 can easily be pulled over the frame of the air passenger seat.

Figure 2:
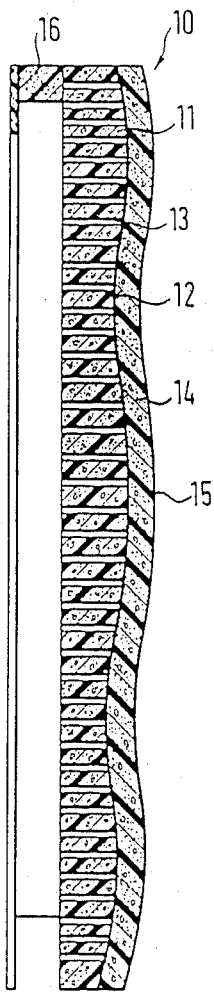
FIG. 2 represents a longitudinal section through a similar cushion having cylindrical recesses and covered with a continuous length of foam.

An alternative construction and design of such a backrest cushion is illustrated in FIG. 2, in which the backrest cushion 10 is again formed by a relatively thick layer of foam 11 which has a surface contour 12 curved to the desired line for the back. This foam layer 11 has cylindrical recesses 13 extending right through its thickness and these recesses may vary in diameter and/or may be placed at varying distances apart. The surface 12 of such a foam layer 11 which is completely perforated by the recesses 13 is covered with a smooth length of foam 14 of constant thickness so that a smooth surface 15 is again obtained.

Figure 3:
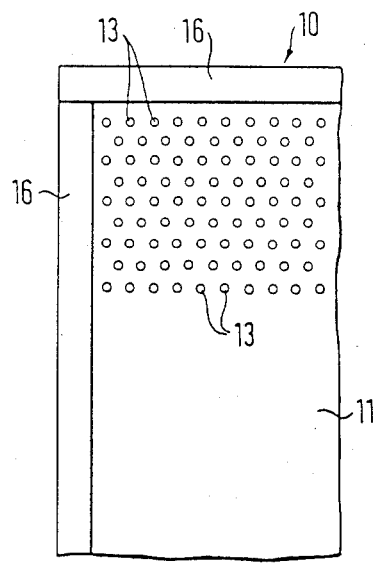
FIG. 3 represents a back view of the backrest cushion of FIG. 2.

As may be seen from FIG. 3 representing a back view of the backrest cushion 10, the cylindrical recesses 13, which are open at the rear in the example illustrated here, are situated relatively close together and extend over the whole area of the backrest cushion. FIG. 3 also shows the position and arrangement of the edges 16 of FIG. 1.

Such a backrest cushion can not only be optimally reduced in weight but also the different parts of it can be individually adjusted to different degrees of hardness for optimum comfort by suitable choice of the size and depth of the incisions 4 or cylindrical recesses 13 and of their distances apart so that even though a uniform material is used for the foam the same advantages are obtained as with the use of a multi-zone foam. Not only can the backrest cushion be made much softer than if it were manufactured from a solid material but also the atmosphere of the seating area can be greatly improved due to the greater air permeability of the cushion.

A particularly advantageous form of backrest cushion is obtained by the construction illustrated in FIGS. 4 and 5, in which the backrest cushion 20 is composed of three separate and individually curved and shaped cushion parts 21, 22 and 23 arranged to support, respectively, the lumbar region, shoulder region and head region. Each of these three cushion parts 21, 22, and 23 again have incisions 24 in the form of grooves all ending equidistant from the surface of the individual cushion parts. These three cushion parts 21, 22 and 23 are connected together by a continuous layer of foam 25 by which the backrest cushion 20 can be fitted to the backrest frame.

The cross-section of FIG. 5 shows that the cushion part 22 and hence the incisions 24 are covered laterally by strips of foam 26 which are rounded off. Such a lateral covering may, of course, also be provided for the backrest cushions 1 and 10 of FIGS. 1 and 2.

The basic material used is advantageously a polyetherpolyurethane block foam having a unit weight of about 25 kg/m³. This foam is then impregnated with a flame-retarding compound composed e.g. of 60 to 70% aluminium hydroxide, 2 to 3% antimony trioxide and 30 to 40% chloroprene latex as binder and the usual stabilizers. The foam is suitably impregnated with 250 to 350% by weight based on the gross weight of the untreated foam, so that an impregnated foam has an overall density of about 60 to 80 kg/m³.

The individual parts of each backrest cushion cut out of the impregnated foam are then joined together by an adhesive which has also been treated with a flame-retarding finish.

A backrest cushion manufactured as described above has been tested according to the most recent requirements of the U.S. Aviation Authorities FAA by exposing the cushion for 2 minutes to the flame of an oil burner at a temperature of 1010° C., corresponding to a radiation intensity of 10.5 W/cm² on the surface. The resulting weight loss was only 2% and thus considerably below the permissible weight loss of 10%. There was no sign of continued glowing nor was there any dripping of molten foam. This flame-retardant foam was found to be completely carbonized in the region of exposure to the flame and therefore forms an ideal thermal insulating layer against continued burning or glowing.

Further tests have shown that backrest cushions constructed and treated with flame retardant finish as described above suffer no loss in seating comfort nor in permeability to air compared with conventional upholstery.

With suitable choice of the foam and arrangement and formation of the recesses, the principle of construction described above may also be applied to seating cushions.

We claim:

1. A backrest cushion of polyurethane foam having recesses (13) extending parallel to the direction of pressure caused by use, said recesses all ending at the same distance from the surface of the cushion, to impart flame resistance said polyurethane foam being impregnated with an impregnant by weight consisting of 30 to 60% of chloroprene latex binder, 40 to 70% aluminum hydroxide and 2 to 3% of antimony trioxide, the impregnated foam having a gross weight of 60 to 80 kg/m³ and the impregnation amounting to 250 to 350% by weight of the untreated foam.

2. A backrest cushion according to claim 1, wherein the recesses (13) are cylindrical and extend parallel to one another.

3. A backrest cushion according to claim 1, wherein the recesses consist of parallel incisions (4;24) in the form of grooves extending transversely over the back at least over a part thereof.

4. A backrest cushion according to claim 1, wherein both cylindrical recesses and recesses in the form of grooves (13;4) are provided in different regions of the backrest cushion (1;10;20).

5. A backrest cushion according to claim 1, wherein the recesses (13) are open to the back of the cushion (10).

6. A backrest cushion according to claim 1, wherein the recesses (4;24) are covered with a further layer of flame-retardant foam (5;25) on the rear surface of the cushion (1;20).

7. A backrest cushion according to claim 1, wherein a foam layer (11) which is profiled on the upper surface (12) has cylindrical recesses (13) extending right through it, which recesses are covered with a smooth, continuous foam layer (14) of constant thickness.

8. A back rest cushion of polyurethane foam having recesses (13) extending parallel to the direction of pressure caused by use, said recesses all ending at the same distance from the surface of the cushion, said polyurethane foam being impregnated with aluminum hydroxide and antimony trioxide in a chloroprene latex binder to impart flame-resistance, the impregnated foam having a gross weight of 60 to 80 kg/m³ and the impregnation amounting to 250 to 350% by weight of the gross weight of the untreated foam, the cushion having three separate, individually curved cushion parts (21,22,23) having transversely extending incisions (24) in the form of grooves for lumbar, shoulder and head region and attached to one continuous layer of impregnated foam (25).

9. A backrest cushion according to claim 8, wherein the recesses (13) are cylindrical and extend parallel to one another.

10. A backrest cushion according to claim 8, wherein the recesses consist of parallel incisions (4;24) in the form of grooves extending transversely over the back at least over a part thereof.

11. A backrest cushion according to claim 8, wherein both cylindrical recesses and recesses in the form of grooves (13;4) are provided in different regions of the backrest cushion (1;10;20).

12. A backrest cushion according to claim 8, wherein the recesses (13) are open to the back of the cushion (10).

13. A backrest cushion according to claim 8, wherein the recesses (4;24) are covered with a further layer of flame-retardant foam (5;25) on the rear surface of the cushion (1;20).

14. A backrest cushion according to claim 8, wherein a foam layer (11) which is profiled on the upper surface (12) has cylindrical recesses (13) extending right through it, which recesses are covered with a smooth, continuous foam layer (14) of constant thickness.

* * * * *

UNITED STATES PATENT AND TRADEMARK OFFICE
CERTIFICATE OF CORRECTION

PATENT NO. : 4,793,574

DATED : December 27, 1988

INVENTOR(S) : Jürgen W. Fenske, et al

It is certified that error appears in the above-identified patent and that said Letters Patent is hereby corrected as shown below:

Col. 2, line 18            Delete "solution" and substitute --cushion--

Signed and Sealed this

Nineteenth Day of September, 1989

Attest:

DONALD J. QUIGG

Attesting Officer        Commissioner of Patents and Trademarks